(12) United States Patent
Lee et al.

(10) Patent No.: US 10,906,019 B2
(45) Date of Patent: Feb. 2, 2021

(54) METHOD FOR PREPARING MODIFIED POLYMERIZATION INITIATOR AND APPARATUS FOR PREPARING MODIFIED POLYMERIZATION INITIATOR

(71) Applicant: LG Chem, Ltd., Seoul (KR)

(72) Inventors: Tae Chul Lee, Daejeon (KR); Won Hee Kim, Daejeon (KR); Hae Sung Sohn, Daejeon (KR); No Ma Kim, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/079,345

(22) PCT Filed: Nov. 30, 2017

(86) PCT No.: PCT/KR2017/013951
§ 371 (c)(1),
(2) Date: Aug. 23, 2018

(87) PCT Pub. No.: WO2018/117472
PCT Pub. Date: Jun. 28, 2018

(65) Prior Publication Data
US 2019/0083949 A1    Mar. 21, 2019

(30) Foreign Application Priority Data

Dec. 22, 2016   (KR) ........................ 10-2016-0177038

(51) Int. Cl.
| | | |
|---|---|---|
| B01J 14/00 | (2006.01) | |
| C08K 5/00 | (2006.01) | |
| B01J 19/18 | (2006.01) | |
| B01J 19/26 | (2006.01) | |
| B01J 19/24 | (2006.01) | |
| B01J 8/08 | (2006.01) | |
| B01J 19/00 | (2006.01) | |
| C08F 2/38 | (2006.01) | |

(52) U.S. Cl.
CPC ............... B01J 14/00 (2013.01); B01J 8/08 (2013.01); B01J 19/0013 (2013.01); B01J 19/0066 (2013.01); B01J 19/18 (2013.01); B01J 19/2415 (2013.01); B01J 19/26 (2013.01); C08F 2/38 (2013.01); C08K 5/00 (2013.01); B01J 2219/00051 (2013.01); B01J 2219/00164 (2013.01); B01J 2219/3327 (2013.01)

(58) Field of Classification Search
None
See application file for complete search history.

(56) References Cited

U.S. PATENT DOCUMENTS

| 4,397,994 A | 8/1983 | Takeuchi et al. |
| 5,502,131 A | 3/1996 | Antkowiak et al. |
| 6,303,721 B1 | 10/2001 | Latsch et al. |
| 2011/0301307 A1 | 12/2011 | Littmann et al. |
| 2014/0058050 A1 | 2/2014 | Tracht et al. |
| 2016/0347877 A1 | 12/2016 | Lee et al. |
| 2017/0015763 A1 | 1/2017 | Joe et al. |
| 2018/0030251 A1 | 2/2018 | Suzuki et al. |
| 2018/0291038 A1 | 10/2018 | Choe et al. |

FOREIGN PATENT DOCUMENTS

| CN | 103189402 A | 7/2013 |
| CN | 105377900 A | 3/2016 |
| EP | 2130841 A1 | 12/2009 |
| EP | 3023439 A1 | 5/2016 |
| JP | H06271706 A | 9/1994 |
| JP | H08277306 A | 10/1996 |
| JP | 2017508859 A | 3/2017 |
| KR | 20000068199 A | 11/2000 |
| KR | 20110114575 A | 10/2011 |
| KR | 20160021225 A | 2/2016 |
| KR | 20160092227 A | 8/2016 |
| WO | 2016139960 A1 | 9/2016 |
| WO | 2017047924 A1 | 3/2017 |

OTHER PUBLICATIONS

Kim et al. Macromolecular Research published year 2014, 22(3), 248-256.*
Extended European Search Report and Written Opinion for EP Application No. 17884146.6, dated Feb. 19, 2019.
Search report from International Application No. PCT/KR2017/013951, dated Mar. 12, 2018.
Chinese Search Report for Application No. 201780017648.1 dated Jul. 3, 2020, 2 pages.

* cited by examiner

*Primary Examiner* — Ana Z Muresan
(74) *Attorney, Agent, or Firm* — Lerner, David, Littenberg, Krumholz & Mentlik, LLP

(57) ABSTRACT

The present invention relates to a method for producing a modified polymerization initiator, and more particularly, to a method for preparing a modified polymerization initiator, wherein the method includes the steps of: (S1) introducing a first fluid and a second fluid into a reactor, and reacting the compounds included in the fluids, and (S2) obtaining the modified polymerization initiator prepared by the reaction of the step (S1) through an outlet of the reactor, wherein the step (S1) and step (S2) are continuously performed, wherein in the step (S1), the flow amount of the first fluid and the second fluid is maintained constant at the time when the first fluid and the second fluid are mixed, and the flow rate of the first fluid is increased. Also, the present invention provides an apparatus for producing a modified polymerization initiator for performing the same.

5 Claims, 1 Drawing Sheet

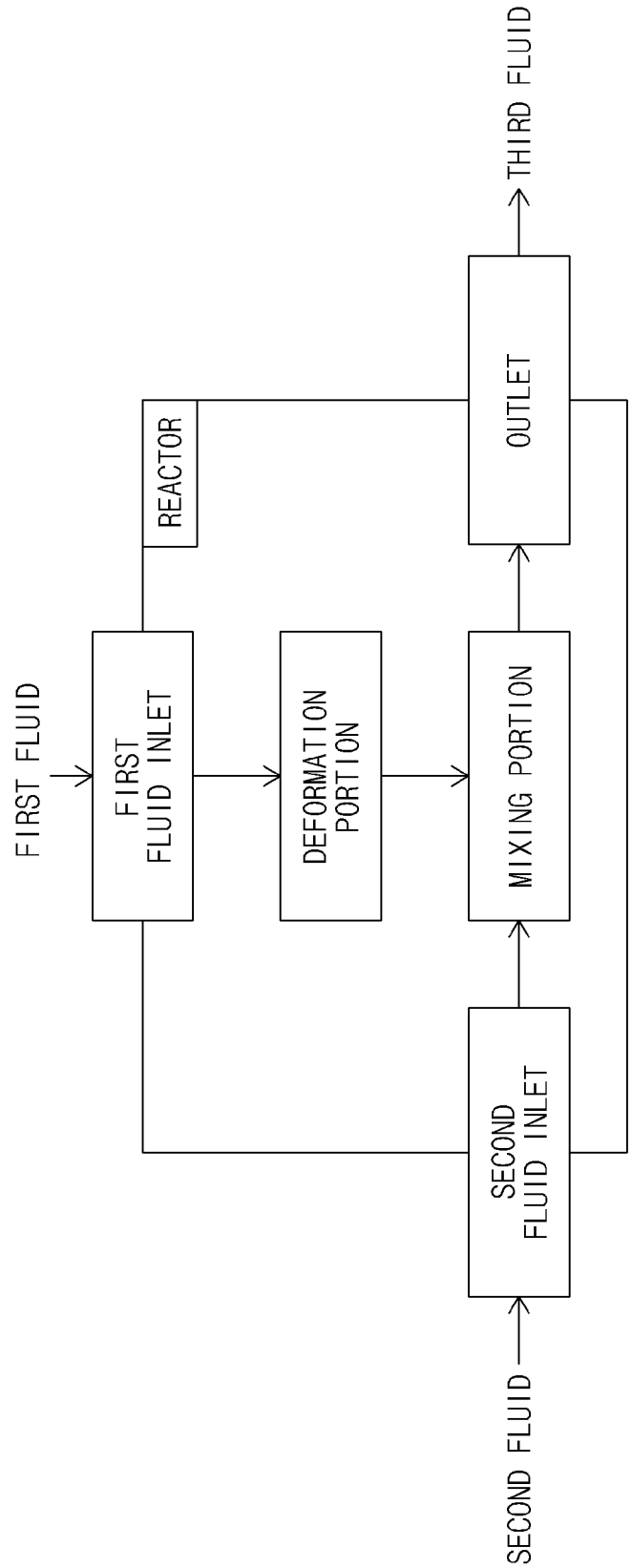

METHOD FOR PREPARING MODIFIED POLYMERIZATION INITIATOR AND APPARATUS FOR PREPARING MODIFIED POLYMERIZATION INITIATOR

CROSS-REFERENCE TO RELATED APPLICATIONS

The present application is a national phase entry under 35 U.S.C. § 371 of International Application No. PCT/KR2017/013951 filed Nov. 30, 2017, which claims priority from Korean Patent Application No. 10-2016-0177038 filed Dec. 22, 2016, the disclosures of which are incorporated herein by reference.

TECHNICAL FIELD

The present invention relates to a method for producing a modified polymerization initiator, and more particularly, to a method for preparing a modified polymerization initiator, wherein in the production of the modified polymerization initiator, the mixing ratio of reactants may be uniformly induced, thereby minimizing side reactions and obtaining the modified polymerization initiator with a high conversion ratio, and to an apparatus for preparing a modified polymerization initiator for performing the same.

BACKGROUND ART

Recently, according to the requirement of low fuel consumption in an automobile, a conjugated diene polymer having a small rolling resistance, good abrasion resistance and tensile properties, and adjustment stability which is represented by wet skid resistance is required as a rubber material for a tire.

In order to decrease the rolling resistance of the tire, a method of decreasing the hysteresis loss of vulcanized rubber is suggested. As the evaluation indexes of the vulcanized rubber, repulsive elasticity at 50° C. to 80° C., tan δ, Goodrich heating, etc. are used. That is, a rubber material having large repulsive elasticity or small tan δ or Goodrich heating is preferably used.

As a rubber material having small hysteresis loss, natural rubber, polyisoprene rubber, polybutadiene rubber, etc., are known, however these materials have small wet skid resistance. Recently, a conjugated diene (co)polymer such as styrene-butadiene rubber (hereinafter referred to as SBR) and butadiene rubber (hereinafter referred to as BR) is prepared by an emulsion polymerization or a solution polymerization, and used as a rubber for a tire. The strongest points of the solution polymerization with respect to the emulsion polymerization are that the amount of a vinyl structure and the amount of styrene regulating the physical properties of the rubber may be optionally controlled, and the molecular weight and the physical properties, etc. may be controlled by coupling, modification, etc. Therefore, since the structure of the SBR or BR rubber finally produced may be easily changed, the movement of a chain terminal may decrease due to the bonding or modification of the chain terminal, and the bonding force with a filler such as silica and carbon black may increase, the SBR by the solution polymerization may be widely used as a rubber material for a tire.

In the case that such SBR obtained by the solution polymerization is used as the rubber material for a tire, the glass transition temperature of the rubber may be increased to control physical properties required for the tire such as running resistance and breaking power by increasing the vinyl content in the SBR, and the glass transition temperature may be also appropriately controlled, thereby reducing fuel consumption. The SBR by the solution polymerization is prepared using an anion polymerization initiator, and is used after combining or modifying the chain terminal of the polymer thus formed by using various modifiers. For example, U.S. Pat. No. 4,397,994 discloses a technique in which an active anion at the chain terminal of a polymer obtained by polymerizing styrene-butadiene in a nonpolar solvent by using alkyllithium, a monofunctional initiator, is bonded by using a binder such as a tin compound.

Meanwhile, carbon black, silica, etc. are used as a filler for reinforcing a tire tread. In the case that the silica is used as the filler for reinforcing, low hysteresis loss and wet skid resistance may be improved. However, the silica with a hydrophilic surface with respect to carbon black with a hydrophobic surface has low affinity for rubber and inferior dispersibility, and a separate silane coupling agent is required to be used to improve dispersibility or impart bonding force between silica-rubber. Accordingly, a method of introducing a functional group having affinity for or reactivity with silica at the terminal of a rubber molecule is suggested, however effects thereof are insufficient.

In addition, in order to introduce the functional group, a method of initiating polymerization through a modified polymerization initiator and introducing a functional group derived from the modified polymerization initiator at the terminal of one side of the polymer is being proposed. However, in the production of the modified polymerization initiator, there is a problem related to productivity such as clogging of piping due to excessive side reaction such as oligomer production due to anionic polymerization reaction between reactants, and mixing of the reactants is not uniformly performed, so that the conversion rate of the initiator may be reduced.

PRIOR ART DOCUMENT

Patent Document (Patent Document 1) JP1994-271706 A

DISCLOSURE OF THE INVENTION

Technical Problem

An aspect of the present invention provides a method for preparing a modified polymerization initiator, wherein the mixing ratio between a modified functional group-containing compound and a polymerization-initiating functional group-containing compound may be uniformly induced, and the modified polymerization initiator may be obtained with a high conversion ratio.

Technical Solution

According to an aspect of the present invention, there is provided a method for preparing a modified polymerization initiator, wherein the method includes the steps of: (S1) introducing a first fluid through a first fluid inlet and a second fluid through a second fluid inlet into a reactor having the first fluid inlet including a first functional group-containing compound and the second fluid inlet including a second functional group-containing compound, and reacting the first functional group-containing compound with the second functional group-containing compound; and (S2)

obtaining a third fluid including the modified polymerization initiator prepared by the reaction of the step (S1) through an outlet provided in the reactor, wherein the step (S1) and step (S2) are continuously performed, wherein in the step (S1), the flow amounts of the first fluid and the second fluid are maintained constant at the time when the first fluid and the second fluid are mixed, and the flow rate of the first fluid is increased at the time when the first fluid and the second fluid are mixed.

According to another aspect of the present invention, there is provided an apparatus for preparing a modified polymerization initiator for performing the above-described method for preparing a modified polymerization initiator, the apparatus being a reactor including a first fluid inlet; a second fluid inlet; a deformation portion for increasing the flow rate of the first fluid; a mixing portion for mixing the first fluid with the second fluid, and an outlet through which the third fluid flows out.

Advantageous Effects

In the case of preparing a modified polymerization initiator according to the present invention, in the production of the modifying initiator, the initial mixing power between a modified functional group-containing compound and a polymerization-initiating functional group-containing compound for preparing the modified polymerization initiator is increased and thus the mixing is easy, and the mixing ratio is uniformly induced and thus the modified functional group-containing compound and the polymerization-initiating functional group-containing compound are maintained at a constant concentration, so that there is an effect that a side reaction such as remaining of a unmodified initiator is minimized and the modified polymerization initiator may be obtained at a high conversion rate.

BRIEF DESCRIPTION OF THE DRAWINGS

FIG. 1 is a flowchart of a process for preparing a modified polymerization initiator, according to an embodiment of the present invention.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In the present invention, the term 'modified initiator' may mean a polymerization initiator for initiating a polymerization reaction, and the polymerization initiator may include the modified functional group of a polymer. The modified initiator may be, for example, a modified initiator for initiating polymerization of a conjugated diene-based polymer, in which case the activity is high and sufficient randomization of monomers may be secured.

In the present invention, the term 'functional group-containing compound' may means a compound substituted by a functional group, which is an atomic group representing a specific property in the molecule of the compound.

A method for preparing a modified polymerization initiator according to the present invention includes the steps of: (S1) introducing a first fluid through a first fluid inlet and a second fluid through a second fluid inlet into a reactor having the first fluid inlet including a first functional group-containing compound and the second fluid inlet including a second functional group-containing compound and reacting the first functional group-containing compound and the second functional group-containing compound; and (S2) obtaining a third fluid including the modified polymerization initiator prepared by the reaction of the step (1) through an outlet provided in the reactor, wherein the step (S1) and the step (S2) are continuously performed, and in the step (S1), the flow amounts of the first fluid and the second fluid are maintained constant at the time when the first fluid and the second fluid are mixed, and the flow rate of the first fluid is increased.

In the case of preparing a modified polymerization initiator according to the method for preparing a modified polymerization initiator, the initial mixing power between the first functional group-containing compound and the second functional group-containing compound is increased and thus the mixing is easy, and the mixing ratio is uniformly induced and thus the first functional group-containing compound and the second functional group-containing compound are maintained at a constant concentration, thereby being capable of minimizing the remaining of a unmodified initiator, preventing the excessive generation of an oligomer, and obtaining the modified polymerization initiator with a high conversion rate.

According to an embodiment of the present invention, the first functional group-containing compound and the second functional group-containing compound may be a modified functional group-containing compound and a polymerization-initiating functional group-containing compound, respectively. When the first functional group-containing compound is a modified functional group-containing compound, the second functional group-containing compound may be a polymerization-initiating functional group-containing compound; when the first functional group-containing compound is a polymerization-initiating functional group-containing compound, the second functional group-containing compound may be a modified functional group-containing compound.

That is, depending on the kind and reactivity of the modified functional group-containing compound and the polymerization-initiating functional group-containing compound, the introducing positions of the modified functional group-containing compound and the polymerization-initiating functional group-containing compound may be determined and the compounds may be introduced.

Meanwhile, the modified functional group-containing compound is a compound for initiating polymerization through the modified polymerization initiator and introducing a modified functional group at the terminal of one side of the polymerized polymer, which may be selected according to the modification purpose of the polymer, and may be, as an example, a compound containing a hydrocarbon group for improving solvent affinity, a compound containing a heteroatom for improving affinity with a filler, and the like. Further, the modified functional group-containing compound is a compound for being anionized through the reaction with a compound containing the polymerization-initiating functional group compound and generating a modified polymerization initiator, which may be a compound containing an unsaturated bond which is easy to be introduced, or a compound containing a hydrogen atom which is easily removed from the polymerization-initiating functional group-containing compound.

As a specific example, the modified functional group-containing compound may be a compound represented by Formula 1 below.

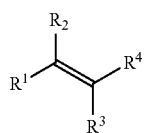

[Formula 1]

In Formula 1, $R^1$ to $R^4$ may be each independently a monovalent hydrocarbon group having 1 to 30 carbon atoms, a heteroalkyl group having 1 to 30 carbon atoms including at least one heteroatom selected from the group consisting of N, O and S, or a heterocyclic group having 4 to 30 carbon atoms including at least one heteroatom selected from the group consisting of N, O and S.

As a more specific example, the compound represented by Formula 1 may be an aromatic vinyl compound such as styrene, α-methylstyrene, and p-methylstyrene; an aromatic vinyl compound derivative in which a monovalent hydrocarbon group, a heteroalkyl group including at least one heteroatom selected from the group consisting of N, O and S, or a heterocyclic group is substituted at one or more carbons constituting the aromatic vinyl compound; a conjugated diene-based compound such as 1,3-butadiene and isoprene; or a conjugated diene-based compound derivative in which a monovalent hydrocarbon group, a heteroalkyl group including at least one heteroatom selected from the group consisting of N, O and S, or a heterocyclic group at one or more carbons constituting the aromatic vinyl compound.

As another example, the modified functional group-containing compound may be a compound represented by Formula 2 below.

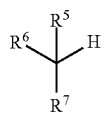

[Formula 2]

In Formula 2, $R^5$ to $R^7$ may be each independently a monovalent hydrocarbon having 1 to 30 carbon atoms, a heteroalkyl group having 1 to 30 carbon atoms and including at least one heteroatom selected from N, O and S, or a heterocyclic group having 4 to 30 carbon atoms and including at least one heteroatom selected from the group consisting of N, O and S. Alternatively, $R^5$ and $R^6$, $R^6$ and $R^7$, or $R^5$ and $R^7$ may be bonded to each other to form a hydrocarbon ring group having 5 to 30 carbon atoms, and when $R^5$ and $R^6$, $R^6$ and $R^7$, or $R^5$ and $R^7$ may be bonded to each other to form a hydrocarbon ring group, the hydrocarbon ring may include —$CR^8R^9$—, —$NR^{10}$—, —O—, or —S— in a ring. $R^8$, $R^9$, and $R^{10}$ may be each independently hydrogen, a monovalent hydrocarbon group having 1 to 30 carbon atoms, a heteroalkyl group having 1 to 30 carbon atoms and including at least one heteroatom selected from the group consisting of N, O and S, or a heterocyclic group having 4 to 30 carbon atoms and including at least one heteroatom selected from the group consisting of N, O and S.

Meanwhile, the polymerization-initiating functional group-containing compound is a compound for reacting with a modified functional group-containing compound to prepare a modified polymerization initiator, and may be, for example, an anionic compound. Specific examples thereof may include a compound in which an organic group representing an anion and a metal representing a cation are bonded by an ionic bond.

As a specific example, the polymerization-initiating functional group-containing compound may be a compound represented by Formula 3 below.

[Formula 3]

In Formula 3, $R^{11}$ may be a monovalent hydrocarbon group having 1 to 30 carbon atoms, and M may be a metal, specifically, an alkali metal.

As a more specific example, the compound represented by Formula 3 may be an anionic compound in which an alkyl group having 10 to 30 carbon atoms, or a proton of at least any one carbon constituting a cycloalkyl group having 4 to 30 carbon atoms is substituted into M. That is, M may be bonded to a neighboring carbon by an ionic bond.

The term 'monovalent hydrocarbon group' used in the present invention may indicate a monovalent atomic group in which carbon and hydrogen are bonded, such as a monovalent alkyl group, alkenyl group, alkynyl group, cycloalkyl group, and cycloalkyl group including at least one unsaturated bond.

According to an embodiment of the present invention, the first fluid including the first functional group-containing compound in the step (S1) may be a first functional group-containing compound itself, or a solution in which the first functional group-containing compound is dissolved in the solvent.

In addition, according to an embodiment of the present invention, the second fluid including the second functional group-containing compound in the step (S1) may be a second functional group-containing compound itself, or a solution in which the second functional group-containing compound is dissolved in the solvent.

When the first fluid and the second fluid are each a solution, the solvent may be a solvent capable of dissolving the first functional group-containing compound and the second functional group-containing compound, and may be, for example, a hydrocarbon solvent such as hexane, cyclohexane, methylcyclohexane, toluene, and ethylbenzene. Further, when the first functional group-containing compound and the second functional group-containing compound are each a solution, each of the first functional group-containing compound and the second functional group-containing compound may be a compound which is dissolved in a range of the solubility or less depending on the solubility with respect to a solvent for dissolving the first functional group-containing compound and the second functional group-containing compound. As described above, when the first fluid and the second fluid are used in the form of a solution, there is an effect that the addition of the compound and the adjustment of the flow rate may be easy.

According to an embodiment of the present invention, the second fluid may include a polar additive in addition to the second functional group-containing compound, and the polar additive may be included at a molar ratio (second functional group-containing compound:polar additive) of 10:1 to 1:10, 5:1 to 1:5, or 2:1 to 1:2 with respect to the second functional group-containing compound. By compensating the difference of a reaction rate between the first functional group-containing compound and the second functional group-containing compound within this range, there is an effect that the side reaction is minimized. The polar additive may be, for example, at least one selected from the group consisting of tetrahydrofuran, ditetrahydrofurylpropane, diethylether, cycloamalether, dipropylether, ethylenemethylether, ethylenedimethylether, diethylglycol, dimethylether, tert-butoxyethoxyethane, bis(3-dimethylaminoethyl)ether, (dimethylaminoethyl)ethylether, trimethylamine, triethylamine, tripropylamine, and tetramethylethylenediamine.

According to an embodiment of the present invention, the step (1) and the step (S2) may be continuously performed. When the step (S1) and the step (S2) are continuously performed, a modified polymerization initiator may be continuously prepared, so that there is an effect that the productivity is excellent. Further, the modified polymerization initiator in which the reaction is completed is not remained in the reactor in the production of a modified polymerization initiator, so that there is an effect that the reaction between the first functional group-containing compound and the second functional group-containing compound is easily performed and the conversion rate of the modified polymerization initiator is excellent.

Meanwhile, the step (S1) may be a step in which the first fluid and the second fluid flow into the respective inlets and are mixed with each other in the reactor, and a modified polymerization initiator is prepared through the reaction between the first functional group-containing compound included in the first fluid and the second functional group-containing compound included in the second fluid according to the mixing.

According to an embodiment of the present invention, in the step (S1), the flow amounts of the first fluid and the second fluid may be maintained constant at the time when the first fluid and the second fluid are mixed. The flow amounts may be flow amounts at the time when the first fluid and the second fluid flow into the respective inlets, and may be controlled by controlling flow amounts at the time when the first fluid and the second fluid flow into the first and second fluid inlets in consideration with the reactivity, the reaction rate, and the reaction environment between the first functional group-containing compound and the second functional group-containing compound.

In addition, according to an embodiment of the present invention, in the step (S1), the flow rate of the first fluid at the time when the first and second fluids are mixed may be increased. The flow rate of the first fluid may be increased as the first fluid flows through a deformation portion provided in the reactor. The deformation portion through which the first fluid flows is configured to instantaneously increase the flow rate of the first fluid at the time when the first and second fluids are mixed, which may exhibit a shape in which the inner diameter, outer diameter, or cross-sectional area of the reactor through which the first fluid flows before the first fluid and the second fluid are mixed may be reduced or gradually decreased within a certain range. As described above, the first fluid flows through the deformation portion in the reactor, so that when the instantaneous flow rate of the first fluid is increased at the time mixed with the second fluid, there is an effect that the mixing power of the first and second fluids are improved without a separate stirrer or mixer, etc. Meanwhile, the flow rate of the first fluid may be temporarily increased only at the time when the first and second fluids pass through the deformation portion and are mixed. That is, after the first fluid and the second fluid are mixed, the third fluid mixed with the first and the second fluids passes through the mixing portion and flows into the outlet, in which case the flow amount and the flow rate of the third fluid may be maintained constant. The third fluid may include a modified polymerization initiator prepared by reacting the first functional group-containing compound and the second functional group-containing compound.

According to an embodiment of the present invention, in the step (S1), the flow rate of the first fluid at the time when the first and second fluids are mixed may be increased at a flow rate of 1.2 times to 20 times, 1.5 times to 10 times, or 2 times to 8 times than the flow rate at the time when the first fluid is introduced into the first fluid inlet and moves in the reactor, and there is an effect that the mixing ratio between the first and second fluids may be uniformly induced within this range and obtain a modified polymerization with a high conversion rate.

Meanwhile, in the flow of the first fluid according to the present invention, the first fluid flows into the reactor through the first fluid inlet, flows along the deformation portion, and then is mixed with the second fluid. The Reynolds number of the first fluid may be maintained constant from the time of flowing through the first fluid inlet up to the time of reaching the deformation portion, and the Reynolds number of the first fluid at the time of passing through the deformation portion and mixing with the second fluid may gradually decrease. This may be due to an increase in the flow rate of the first fluid increasing due to the deformation portion at the time when the first fluid and the second fluid are mixed, but a decrease in the inner diameter, the outer diameter or the cross-sectional area of the deformation portion exhibiting a shape in which the inner diameter, the outer diameter or the cross-sectional area of the reactor is reduced or gradually decreased within a certain range.

In addition, in the flow of the second fluid according to the present invention, the second fluid flows into the reactor and is mixed with the first fluid. The Reynolds number of the second fluid may be maintained constant from the time when the second fluid is introduced into the second fluid inlet and flows to the time when the first and second fluids are mixed.

As described above, according to the present invention, the first fluid and the second fluid exhibit different flows from each other up to the time of mixing in the reactor, the mixing force increases at the time of mixing with each other, and thus the mixing ratio is uniformly induced to maintain the constant concentration of the modified functional group-containing compound and the polymerization-initiating functional group-containing compound, thereby minimizing a side reaction such as remaining of a unmodified initiator and obtaining a modified polymerization initiator with a high conversion ratio.

According to an embodiment of the present invention, when the first fluid and the second fluid are introduced in the step (S1), the flow directions of the first fluid and the second fluid may be perpendicular to each other. The flow directions of the first fluid and the second fluid may be adjusted by the installation positions of the first fluid inlet and the second fluid inlet, and the first fluid inlet and the second fluid inlet may be adjusted by being provided in the perpendicular direction to each other in the reactor.

As another example, when the first fluid and the second fluid are introduced, the flow directions of the first fluid and the second fluid may be perpendicular to each other. However, the first fluid is introduced into the reactor, passes through the deformation portion, and the flow direction of the two fluids may be deformed while the fluid flows. Accordingly, the flow direction of the first fluid and the second fluid at the time of mixing may be parallel, in which case the contact area between the first fluid and the second fluid becomes wide at the time of mixing the first fluid and the second fluid, and thus there is an excellent effect of being mixed uniformly.

Herein, the meaning of parallel may mean that the flows of two fluids form an angle close to parallel, and may not be a term that the two fluids are limited as making the perfect parallel to each other.

As another example, in step (S1), a molar ratio (first functional group-containing compound: second functional group-containing compound) of the introduced first and second functional group-containing compounds may be 10:1 to 1:10, 1:1 to 1:5, 3:1 to 1:3, or 2:1 to 1:2. The side reaction may be minimized within this range, and the reaction molar ratio may be also adjusted according to the loss, inactivation, and the like of the first and second functional group-containing compounds, and thus there is an effect that the reaction molar ratio of the first functional group-containing compound and the second functional group-containing compound is finally adjusted to be 2:1 to 1:2. Further, when the first functional group-containing compound or the second functional group-containing compound is a modified functional group-containing compound including an unsaturated bond in the molecule like the compound represented by Formula 1, an anionic polymerization reaction with the modified functional group-containing compound including a neighboring unsaturated bond may be performed during the reaction with the polymerization-initiating functional group-containing compound. Accordingly, not only a product is generated by a 1:1 reaction between the modified functional group-containing compound and the polymerization-initiating functional group-containing compound, but at least two modified functional group-containing compounds are bonded to excessively generate a dimer, a trimer, and a polymer oligomer having a trimer or more and the like, so that a problem such as clogging the outlet may occur. Therefore, the method for preparing a modified polymerization initiator according to the present invention may be performed such that the first functional group-containing compound and the second functional group-containing compound react at an appropriate molar ratio, depending on the conditions of the polymer to be prepared from the modified polymerization initiator, so that the product may be obtained.

In addition, according to an embodiment of the present invention, the internal temperature of the reactor may be −50° C. to 50° C., −40° C. to 40° C.-50° C., or −30° C. to 30° C. Within this range, the reaction rate may be excellent and the side reaction may be minimized.

An apparatus for preparing a modified polymerization initiator according to the present invention is configured to perform the method for preparing a modified polymerization initiator, and the apparatus may be a reactor including a first fluid inlet, a second fluid inlet, a deformation portion for increasing the flow rate of a first fluid, a mixing portion for mixing the first fluid and a second fluid, and an outlet through which the fluid flows out.

The reactor may be, for example, a tubular reactor. The inner diameter, outer diameter, or cross-sectional area of the first fluid inlet, second fluid inlet, and the outlet provided in the reactor may be each independently 0.01 to 0.99 times, 0.05 to 0.95 times, 0.1 to 0.9 times, or 0.3 to 0.7 times of the inner diameter, outer diameter, or cross-sectional area of the reactor, and there is an excellent effect in that the flow rate of the first fluid is increased within this range.

The first fluid inlet may be provided, for example, at an end portion or a side portion of the reactor. Further, the second fluid inlet may be provided, for example, at an end portion or a side portion of the reactor, and may be provided in the form inserted into the reactor.

The outlet may be connected, for example, to a polymerization reactor for initiating polymerization from a modified polymerization initiator, and the polymerization reactor may be a continuous reactor.

The deformation portion is configured to instantaneously increase the flow rate of the first fluid at the time when the first fluid flowing into the first fluid inlet is mixed with the second fluid flowing into the second fluid inlet. The deformation portion may exhibit a shape in which the inner diameter, outer diameter, or cross-sectional area of the reactor through which the first fluid flows before the time when the first fluid and the second fluid are mixed is reduced or gradually decreased in a certain range from the first fluid inlet or the second fluid inlet in the outlet direction. As another example, the shape in which the inner diameter, outer diameter, cross-sectional area of the deformation portion is reduced or gradually decreased may be a shape of which the dimensions are reduced or gradually decreased from the inner diameter, outer diameter, and cross-sectional area of the reactor to the inner diameter, outer diameter, and cross-sectional area of the outlet. According to an embodiment of the present invention, the time when the first and second fluids are mixed in a mixing portion may be a time of passing through the end portion of the deformation portion.

The mixing portion may be separately provided in the reactor, or may mean a position in which the first fluid having passed through the deformation portion and the second fluid having passed through the second fluid inlet are mixed with each other in the reactor.

Hereinafter, the present invention will be described in more detail with reference to Examples. However, Examples below are only for illustrating of the present invention, the present invention is not limited only to these Examples.

EXAMPLE

Example 1

A tubular reactor having a first fluid inlet, a second fluid inlet, a deformation portion, and an outlet was provided. The outer diameter of the tubular reactor body is ¼ inches, the first fluid inlet is provided at a side portion of the tubular reactor and the outer diameter thereof is ⅛ inches, the second fluid inlet is provided in the form inserted into the inside from an end portion of one side of the tubular reactor to the connection portions of the deformation portion and the outlet, but is spaced apart from the connection portions of the deformation portion and the outlet, and the outer diameter thereof is ⅛ inches, the outlet is provided at an end portion of the other side of the tubular reactor and the outer diameter thereof is ⅛ inches, and the deformation portion is spaced apart from a position at which the first fluid inlet of the reactor is provided, and is connected to the outlet in the form in which the outer diameter thereof gradually decreases from the outer diameter of the tubular reactor to the outer diameter of the outlet.

A solution in which 1.5 wt % of n-butyllithium as a polymerization-initiating functional group-containing compound was dissolved in n-hexane was introduced at a rate of 350 g/hr through the first fluid inlet, and the Reynolds number was about 53. At the same time, a solution in which 3.8 wt % of dimethylvinylbenzylamine (DMVBA) as a modified functional group-containing compound was dissolved together with 2.7 wt % of tetramethylethylenediamine (TMEDA) as a polar additive in n-hexane was introduced at a rate of 350 g/hr through the second fluid inlet, and the Reynolds number was about 230. In this case, the molar ratio of n-butyllithium and dimethylvinylbenzylamine was 1:1, and the molar ratio of dimethylvinylbenzylamine and tetramethylethylenediamine was 1:1.

The n-butyllithium solution introduced into the first fluid inlet passed through the deformation portion of the reactor while having moved at a flow rate of 18 mm/sec, and at the same time, passed through the second fluid inlet in the state in which the flow rate was increased at 90 mm/sec, thereby having been mixed with the dimethylvinylbenzylamine and tetramethylenediamine solution having moved to the starting point of the outlet. Next, a mixed solution with which the n-butyllithium solution and the dimethylvinylbenzylamine and tetramethylenediamine solution were mixed flowed into the outlet simultaneously with the mixing, thus having performed the reaction while having passed a tube having an outer diameter of ⅛ inches and a length of 1.2 m provided at the outlet during the duration of about 10 seconds, and a modified polymerization initiator, the resulting product, was obtained continuously from the tube provided at the outlet. In this case, the Reynolds number of the tube provided in the outlet was about 470.

The modified polymerization initiator compound thus obtained was hydrogenated by using an excessive amount of ethanol. As a result of checking by gas chromatography, it could be ascertained that the dimethylvinylbenzylamine introduced as a modified functional group-containing compound was not detected, and the modified polymerization initiator compound was generated at a conversion rate of 99 mol % or more.

In addition, in the gas chromatography, as a result of using tetramethylenediamine introduced together with the dimethylvinylbenzylamine as an internal standard material, the area of the modified polymerization initiator compound among the area of gas chromatography of the tetramethylethylenediamine and the modified polymerization initiator compound was 73.1%.

Example 2

Example 2 was performed in the same manner as in Example 1, except that a solution in which 4.9 wt % of dimethylvinylbenzylamine (DMVBA) was dissolved together with 2.7 wt % of tetramethylethylenediamine (TMEDA) as a polar additive in n-hexane was introduced instead of a solution in which 3.8 wt % of dimethylvinylbenzylamine (DMVBA) was dissolved together with 2.7 wt % of tetramethylethylenediamine (TMEDA) as a polar additive in n-hexane in Example 1. In this case, the molar ratio of n-butyllithium and dimethylvinylbenzylamine was 1:1.3, and the molar ratio of dimethylvinylbenzylamine and tetramethylethylenediamine was 1:0.77.

The modified polymerization initiator compound thus obtained was hydrogenated by using an excessive amount of ethanol. As a result of checking by gas chromatography, it could be ascertained that the dimethylvinylbenzylamine introduced as a modified functional group-containing compound was not detected, and the modified polymerization initiator compound was generated at a conversion rate of 99 mol % or more.

In addition, in the gas chromatography, as a result of using tetramethylenediamine introduced together with the dimethylvinylbenzylamine as an internal standard material, the area of the modified polymerization initiator compound among the area of gas chromatography of the tetramethylethylenediamine and the modified polymerization initiator compound was 77.4%.

Comparative Example 1

A tubular reactor having a first fluid inlet, a second fluid inlet, and an outlet was provided. The outer diameter of the tubular reactor body is ¼ inches, the first fluid inlet is provided at a side portion of the tubular reactor and the outer diameter thereof is ⅛ inches, the second fluid inlet is provided at an end portion of one side of the tubular reactor and the outer diameter thereof is ⅛ inches, and the outlet is provided at an end portion of the other side of the tubular reactor and the outer diameter thereof is ⅛ inches.

A solution in which 1.5 wt % of n-butyllithium as a polymerization-initiating functional group-containing compound was dissolved in n-hexane was introduced at a rate of 350 g/hr through the first fluid inlet. In this case, the n-butyllithium solution introduced into the first fluid inlet moved at a flow rate of 18 mm/sec, and the Reynolds number was about 53. At the same time, a solution in which 3.8 wt % of dimethylvinylbenzylamine (DMVBA) as a modified functional group-containing compound was dissolved together with 2.7 wt % of tetramethylethylenediamine (TMEDA) as a polar additive in n-hexane was introduced at a rate of 350 g/hr through the second fluid inlet, and the Reynolds number was about 230. In this case, the molar ratio of n-butyllithium and dimethylvinylbenzylamine was 1:1, and the molar ratio of dimethylvinylbenzylamine and tetramethylethylenediamine was 1:1.

An n-butyllithium solution introduced into the first fluid inlet passed through the second fluid inlet in the reactor simultaneously with the addition and was mixed with the introduced dimethylvinylbenzylamine and tetramethylenediamine solution. Next, a mixed solution in which the n-butyllithium solution were mixed with the dimethylvinylbenzylamine and tetramethylenediamine solution flowed into the outlet along the flow in the reactor, thus having performed the reaction while having passed a tube having an outer diameter of ⅛ inches and a length of 1.2 m provided at the outlet during the duration of about 10 seconds, and a modified polymerization initiator, the resulting product, was obtained continuously from the tube provided in the outlet. In this case, the Reynolds number of the tube provided at the outlet was about 470.

The modified polymerization initiator compound thus obtained was hydrogenated by using an excessive amount of ethanol. As a result of checking by gas chromatography, it could be ascertained that the dimethylvinylbenzylamine introduced as a modified functional group-containing compound was not detected, and the modified polymerization initiator compound was generated at a conversion rate of 99 mol % or more.

In addition, in the gas chromatography, as a result of using tetramethylenediamine introduced together with the dimethylvinylbenzylamine as an internal standard material, the area of the modified polymerization initiator compound among the area of gas chromatography of the tetramethylethylenediamine and the modified polymerization initiator compound was 65.7%

Meanwhile, as a result of continuous operation under the operating conditions, after 13 hours from the start of the operation, the outlet of the reactor was clogged, and thus no more modified polymerization initiator compound was capable of being prepared.

Comparative Example 2

600 g of hexane, 32 g of a 1.6 M n-butyllithium solution, and 8.9 g of tetramethylethylenediamine were introduced into a 3 L-sized temperature controllable batch reactor, and the temperature of the reactor was maintained at 10° C. Then, while stirring the reactor, 12.3 g of dimethylvinylbenzylamine was introduced dropwise from the upper portion of the reactor in a dropwise manner. After the addition of the dimethylvinylbenzylamine was completed and the mixture was stirred for 10 minutes, a part of the resulting modified polymerization initiator compound was fractionated and hydrogenated with an excessive amount of ethanol. As a result of gas chromatography, it could be ascertained that dimethylvinylbenzylamine introduced into the modified functional group-containing compound was not detected, and the modified polymerization initiator compound was generated at a conversion rate of 99 mol % or more.

In addition, in the gas chromatography, as a result of using tetramethylethylenediamine introduced together with the dimethylvinylbenzylamine as an internal standard material, the area of the modified polymerization initiator compound among the area of gas chromatography of the tetramethylethylenediamine and the modified polymerization initiator compound was 31.5%.

Experimental Example

The conversion rates of modified polymerization initiators in Examples and Comparative Examples were analyzed by gas chromatography.

The gas chromatography used a column of HP5, and the temperature of an oven was maintained at 50° C. for 5 minutes, and then the temperature was raised to 300° C. at a heating rate of 10° C. per minute and maintained for 5 minutes. In this case, tetramethylethylenediamine was detected at about 3 minutes and 30 seconds, dimethylvinylbenzylamine was detected at about 13 minutes, and a modified polymerization initiator was detected at about 18 minutes.

As a result of the analysis of gas chromatography as described above, modified polymerization initiators were generated at a conversion rate of 99 mol % or more in all of Examples 1 and 2 and Comparative Examples 1 and 2. However, as a result of using tetramethylethylenediamine as an internal standard material, it was ascertained that in Examples 1 and 2 in which the modified polymerization initiator was prepared according to the present invention, the areas of the modified polymerization initiator compound among the area of gas chromatography of the tetramethylethylenediamine and the modified polymerization initiator compound were 73.1% and 77.4%, respectively. On the other hand, in Comparative Example 1 in which the flow rate of the first fluid was not controlled unlike the present invention, the area of the modified polymerization initiator compound exhibited to be relatively high as 65.7%. However, it could be ascertained that an oligomer was generated in the reactor over time in the long-term operation process of 12 hours or more, and the shape of the resulting modified polymerization initiator compound was thus not constant, so that the area of the modified polymerization initiator compound was not maintained constant, and finally, the operation was not performed due to clogging of the outlet in the continuous production of the modified polymerization initiator. Meanwhile, in Comparative Example 2 in which the modified polymerization initiator was prepared by a batch method rather than a continuous method, it was observed that the area of the modified polymerization initiator compound was only 31.5%, the shape of the resulting modified polymerization initiator was also irregular, and the activity of the modified polymerization initiator was reduced over time.

From the result as described above, in the case of preparing a modified polymerization initiator according to the present invention, it could be ascertained that in the production of the modified polymerization initiator, the initial mixing power between the modified functional group-containing compound and the polymerization-initiating functional group-containing compound for preparing a modified polymerization initiator was increased and thus the mixing was easy, and the mixing ratio was induced uniformly and thus the modified functional group-containing compound and the polymerization-initiating functional group-containing compound was maintained at a constant concentration, so that the side reaction such as remaining of a unmodified polymerization initiator was minimized and the modified polymerization initiator was obtained with a high conversion rate.

The invention claimed is:
1. A method for preparing a modified polymerization initiator, the method comprising the steps of:
(S1) introducing a first fluid through a first fluid inlet and a second fluid through a second fluid inlet into a reactor wherein the first fluid comprises a first functional group-containing compound and the second fluid comprises a second functional group-containing compound, and reacting the first functional group-containing compound with the second functional group-containing compound to obtain a modified polymerization initiator; and
(S2) obtaining a third fluid including the modified polymerization initiator prepared by the reaction of the step (S1) through an outlet provided in the reactor,
wherein the first functional group-containing compound is a modified functional group-containing compound or a polymerization-initiating functional group-containing compound, and
when the first functional group-containing compound is a modified functional group-containing compound, the second functional group-containing compound is a polymerization-initiating functional group-containing compound; and when the first functional group-containing compound is a polymerization-initiating functional group-containing compound, the second functional group-containing compound is a modified functional group-containing compound, and
wherein the modified functional group-containing compound is a compound represented by Formula 1 below, and the polymerization initiating functional group-containing compound is a compound represented by Formula 3 below,

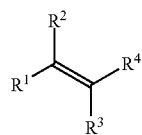

[Formula 1]

wherein in Formula 1, $R^1$ to $R^4$ are each independently a monovalent hydrocarbon group having 1 to 30 carbon atoms, a heteroalkyl group having 1 to 30 carbon atoms including at least one heteroatom selected from the group consisting of N, O and S, or a heterocyclic group having 4 to 30 carbon atoms including at least one heteroatom selected from the group consisting of N, O and S;

$R^{11}$-M  [Formula 3]

wherein in Formula 3, $R^{11}$ is a monovalent hydrocarbon group having 1 to 30 carbon atoms, and M is an alkali metal, wherein the step (S1) and step (S2) are continuously performed, wherein in the step (S1), the flow amounts of the first fluid and the second fluid are maintained constant at the time when the first fluid and the second fluid are mixed, and the flow rate of the first fluid is increased at the time when the first fluid and the second fluid are mixed.

2. The method of claim 1, wherein the first fluid and the second fluid meet in parallel at the time when the first fluid and the second fluid are mixed.

3. The method of claim 1, wherein when the first fluid and the second fluid are introduced in the step (S1), the respective flow directions of the first fluid and the second fluid are perpendicular to each other.

4. The method of claim 1, wherein the molar ratio (first functional group-containing compound:second functional group-containing compound) of the first functional group-containing compound and the second functional group-containing compound, which are introduced in the step (S1), is 10:1 to 1:10.

5. The method of claim 1, wherein the internal temperature of the reactor is from −50° C. to 50° C.

* * * * *